UNITED STATES PATENT OFFICE.

ALFRED SCHAARSCHMIDT, OF BASEL, SWITZERLAND, ASSIGNOR TO THE FIRM OF SOCIETY OF CHEMICAL INDUSTRY IN BASLE, OF BASEL, SWITZERLAND.

ORANGE TO ORANGE-YELLOW VAT DYE AND PROCESS OF MAKING SAME.

No. 899,845.  Specification of Letters Patent.  Patented Sept. 29, 1908.

Application filed April 22, 1908. Serial No. 428,688.

*To all whom it may concern:*

Be it known that I, ALFRED SCHAARSCHMIDT, doctor of philosophy and chemist, a subject of the King of Saxony, and resident of Basel, Switzerland, have invented new and useful Orange to Orange-Yellow Vat Dyes and a Process of Making the Same, of which the following is a full, clear, and exact specification.

I have found that by heating 2-methylanthraquinone and 2-methylhalogenanthraquinones (in the anthraquinone nucleus halogen substituted 2-methylanthraquinone) with sulfur at a high temperature and by treating subsequently the raw product thus obtained with a hypochlorite new valuable orange to orange-yellow vat dyes are obtained. The manufacture of these new vat-dyes is illustrated by the following examples:

Example I. 10 parts of 2-methylanthraquinone are heated with 30–40 parts of sulfur to 290–300° C., until the evolution of hydrogen hydrosulfid has nearly ceased. Then the temperature is raised to 320–330° C., at which temperature a second evolution of hydrogen sulfid takes place. When this latter also has ceased, the melt is cooled, pulverized and extracted with carbon disulfid. The so obtained raw-dye, which dyes cotton from its alkaline hydrosulfite vat dirty brownish-olive tints, is mixed with a dilute solution of sodium hypochlorite to form a thin paste and then heated at the water bath temperature, until the dark coloration of the mixture has changed to a pure orange coloration. The resulting dyestuff is then separated by filtration, washed with water and dried. It constitutes an orange powder, dissolving in concentrated sulfuric acid with a dirty wine-red color and in fuming sulfuric acid of 24% anhydrid with a dark green coloration. With soda-lye and hydrosulfite it yields an orange-red vat dyeing unmordanted cotton brown shades turning by their exposure to the air or more quickly by their passage through a dilute solution of sodium hypochlorite to clear orange tints fast to washing, light and chlorin.

Example II. 10 parts of the 2-methyl-3-chloranthraquinone melting at 215° C. are heated with 30 to 40 parts of sulfur for about 3 to 4 hours at 250° to 280° C. The resulting melted mass is cooled down, pulverized and extracted with carbon disulfid or a solution of sodium sulfid in order to eliminate the excess of sulfur from the mass. The dye thus obtained can be employed directly for dyeing or after it has been purified by a treatment with sodium hypochlorite. To this latter purpose the dye is diluted with water in order to form a fluid mass to which a solution of sodium hypochlorite is added and the resulting mixture is stirred during 1 hour at the ordinary temperature or at the temperature of water bath. The dye is then isolated by filtration, washed with water and dried. It constitutes a yellow-brown powder dissolving in concentrated sulfuric acid to a violet-blue solution and in fuming sulfuric acid of 24 per cent. anhydrid with a pure green coloration. By its treatment with soda-lye and hydrosulfite it yields a brown vat dyeing cotton brown tints turning by exposure to the air or more quickly by a passage through a dilute solution of hypochlorite to a pure orange-yellow. The dyeings are fast to washing, light and chlorin.

If in the foregoing Example II, the reaction is performed at a higher temperature of (300° to 330° C.) a more reddish product is obtained, while by the performance of the reaction at a lower temperature a more yellowish product is obtained.

What I claim is:

1. The described process for the manufacture of orange to orange-yellow vat-dyes of the anthraquinone-series, which consists in heating 2-methylanthraquinone with sulfur to a high temperature and then treating the resulting raw-products with a hypochlorite.

2. The described process for the manufacture of orange to orange-yellow vat-dyes by heating 2-methylhalogen-anthraquinones with sulfur to a high temperature and then treating the resulting raw-products with a hypochlorite.

3. The described process for the manufacture of orange to orange-yellow vat-dyes by heating 2-methyl-3-chloro-anthraquinone with sulfur to a high temperature and then treating the resulting raw-products with a hypochlorite.

4. As new products the vat-dyes, obtainable by heating 2-methyl-anthraquinone with sulfur to a high temperature and then treating the resulting raw-products with a hypochlorite, constituting in dry state orange to orange-yellow powders soluble in concentrated surfuric acid to dirty claret-colored to reddish-violet solutions and in fuming sulfuric acid of 24 per cent. anhydrid to dark green solutions and yielding with alkaline reducing agents vats dyeing cotton orange to orange-yellow tints fast to washing, light and chlorin.

5. As new products the vat-dyes, obtainable by heating 2-methyl-3-chloranthraquinone with sulfur to a high temperature and then treating the resulting raw-products with a hypochlorite, constituting in dry state orange to brownish-yellow powders soluble in concentrated sulfuric acid with a violet to violet-blue color, dissolving in fuming sulfuric acid of 24 per cent. anhydrid to green solutions and yielding with alkaline reducing agents vats dyeing cotton orange-yellow shades fast to washing, light and chlorin.

In witness whereof I have hereunto signed my name this ninth day of April 1908, in the presence of two subscribing witnesses.

ALFRED SCHAARSCHMIDT.

Witnesses:
   GEO. GIFFORD,
   ARNOLD ZUBER.